(12) United States Patent
Jiang et al.

(10) Patent No.: US 12,195,019 B2
(45) Date of Patent: Jan. 14, 2025

(54) ON-BOARD PARAMETER TUNING FOR CONTROL MODULE FOR AUTONOMOUS VEHICLES

(71) Applicants: Apollo Autonomous Driving USA LLC, Sunnyvale, CA (US); Beijing Baidu Netcom Science Technology Co., Ltd., Beijing (CN)

(72) Inventors: Shu Jiang, Sunnyvale, CA (US); Hao Liu, Sunnyvale, CA (US); Szu-Hao Wu, Sunnyvale, CA (US); Fuyang Zhao, Beijing (CN); Xiaoyi Zhu, Beijing (CN); Haofeng Kou, Sunnyvale, CA (US); Helen K. Pan, Sunnyvale, CA (US)

(73) Assignees: APOLLO AUTONOMOUS DRIVING USA LLC, Sunnyvale, CA (US); BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/003,017

(22) PCT Filed: Nov. 28, 2022

(86) PCT No.: PCT/CN2022/134663
§ 371 (c)(1),
(2) Date: Dec. 22, 2022

(87) PCT Pub. No.: WO2024/113087
PCT Pub. Date: Jun. 6, 2024

(65) Prior Publication Data
US 2024/0246549 A1   Jul. 25, 2024

(51) Int. Cl.
*B60W 60/00*   (2020.01)
*B60W 50/04*   (2006.01)
*B60W 50/00*   (2006.01)

(52) U.S. Cl.
CPC .......... *B60W 50/045* (2013.01); *B60W 60/00* (2020.02); *B60W 2050/0022* (2013.01); *B60W 2520/10* (2013.01); *B60W 2520/105* (2013.01); *B60W 2556/10* (2020.02)

(58) Field of Classification Search
CPC ............... B60W 50/045; B60W 60/00; B60W 2556/10; B60W 2050/0022; B60W 2520/10; B60W 2520/105
See application file for complete search history.

*Primary Examiner* — Mathew Franklin Gordon
(74) *Attorney, Agent, or Firm* — WOMBLE BOND DICKINSON (US) LLP (57) ABSTRACT

In one embodiment, a microcontroller unit (MCU) receives an expected state of an autonomous driving vehicle (ADV) from a controller of the ADV, where the controller controls motions of the ADV using a control algorithm. The MCU receives sensor data from one or more sensors of the ADV. The MCU determine an actual state of the ADV based on the sensor data. The MCU determines a performance metric of the control algorithm based on the expected state and the actual state. In response to determining the performance metric has satisfied a predetermined condition, the MCU determines a plurality of weight values for the control algorithm. The MCU sends the plurality of weight values to the control system to tune one or more weight parameters of the control algorithm using the plurality of weight values, where the controller controls the ADV using the tuned control algorithm.

20 Claims, 9 Drawing Sheets

ON-BOARD PARAMETER TUNING FOR CONTROL MODULE FOR AUTONOMOUS VEHICLES

CROSS-REFERENCE TO RELATED APPLICATION

This application is a National Stage of International Application No. PCT/CN2022/134663, filed Nov. 28, 2022, which is hereby incorporated by reference in its entirety.

TECHNICAL FIELD

Embodiments of the present disclosure relate generally to operating autonomous driving vehicles. More particularly, embodiments of the disclosure relate to on-board parameter tuning for control module for autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. When an autonomous vehicle navigates on different road surfaces with different loads, a same control input might lead to different vehicle velocities and steering directions.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a microcontroller unit (MCU) receives information from sensors and a controller of an autonomous driving vehicle (ADV) to determine if the parameters of the controller is optimal and tunes the controller parameters accordingly to improve motion planning of the ADV.

Motion planning and control are critical operations in autonomous driving. When an autonomous vehicle navigates on a road with different loads or under different weather/road conditions, a control input under different road/weather conditions might lead to different vehicle states (velocity, heading direction, etc.). For example, when the road is wet, the vehicle tire friction is altered. A same control input, such as brake or throttle, will result in different vehicle velocities. A current implementation uses one set of controller parameters for all driving conditions, which might lead to uncomfortable or even unsafe driving behaviors for the ADV. Thus, the controller parameters will have to be tuned, or the untuned controller will lead to an inadequately posed optimization control problem, which can cause undesired oscillations in the control variables. Tuned controller parameters allow good estimations of the system behavior and avoid high computational cost in the calculation of the control actions.

According to one embodiment, a microcontroller unit (MCU) receives an expected state of an autonomous driving vehicle (ADV) from a controller of the ADV, where the controller controls motions of the ADV using a control algorithm. The MCU receives sensor data from one or more sensors of the ADV. The MCU determine an actual state of the ADV based on the sensor data. The MCU determines a performance metric of the control algorithm based on the expected state and the actual state. In response to determining the performance metric has satisfied a predetermined condition, the MCU determines a plurality of weight values for the control algorithm. The MCU sends the plurality of weight values to the controller to cause one or more weight parameters of the control algorithm to be tuned, where the controller controls the ADV using the tuned control algorithm.

Figure 1:
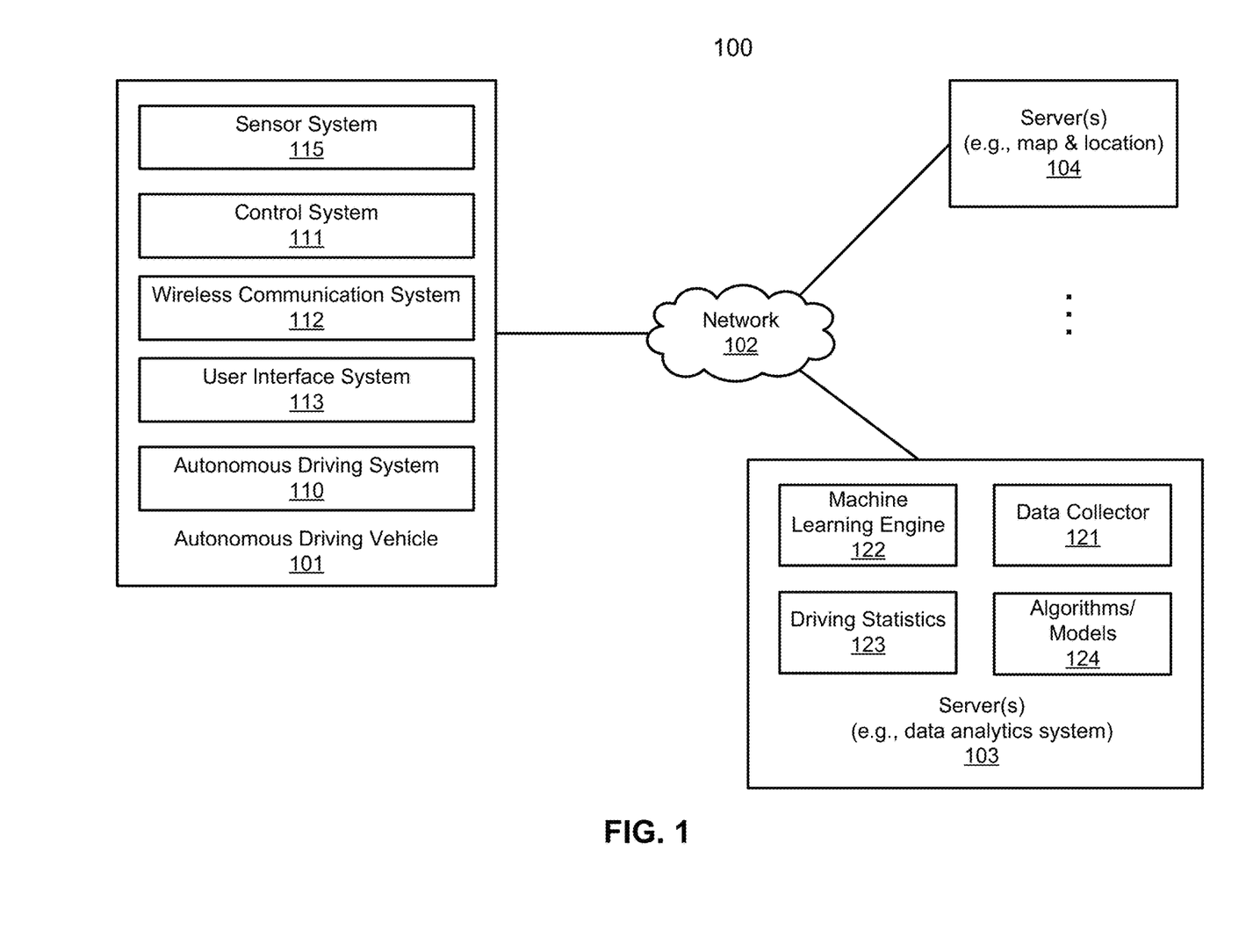
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
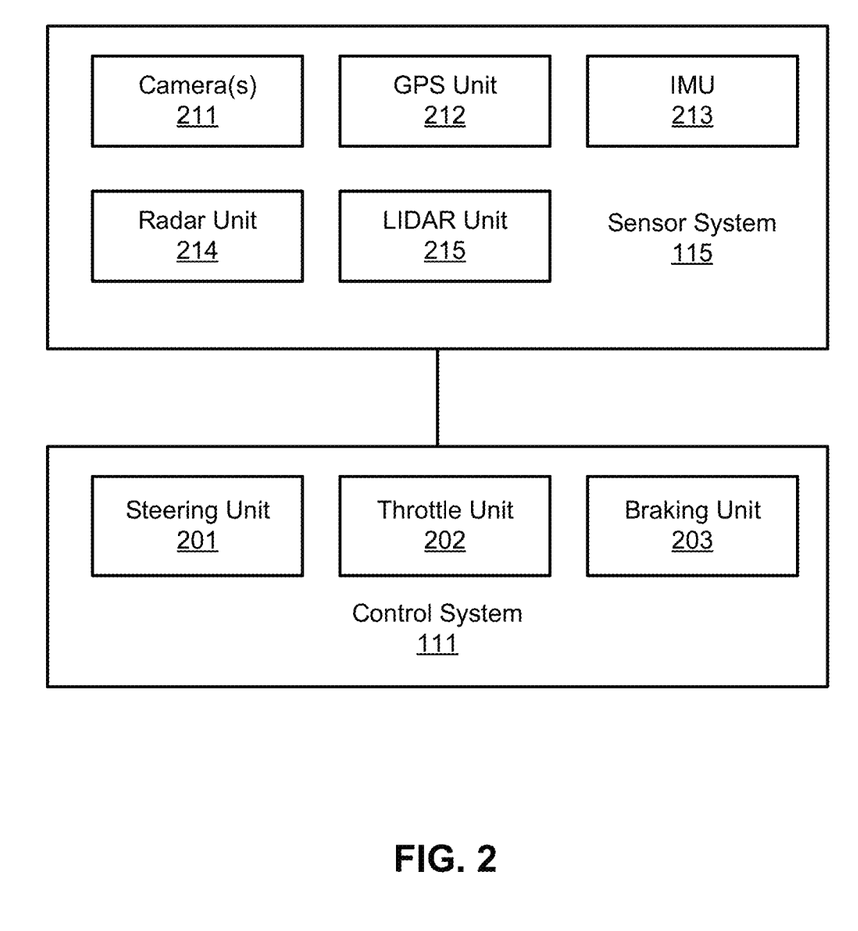
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a rule-based parameters selection algorithm to select a set of parameters for a controller of the ADV. Algorithms 124 can include a machine learning algorithm trained to generate a set of parameters using vehicle states (e.g., velocity, heading direction, position, weight, etc.), vehicle controls (percent throttle, brake, steering angle), and one or more environment factors. The environment factors can include local weather pattern (such as raining, snowing, sunny, etc.), road conditions (such as slippery, slanted, dirt path, etc.), and/or other factors that can cause the vehicle dynamics to change.

Algorithms 124 can then be uploaded on ADVs to be utilized during autonomous driving in real-time.

Figure 3A:
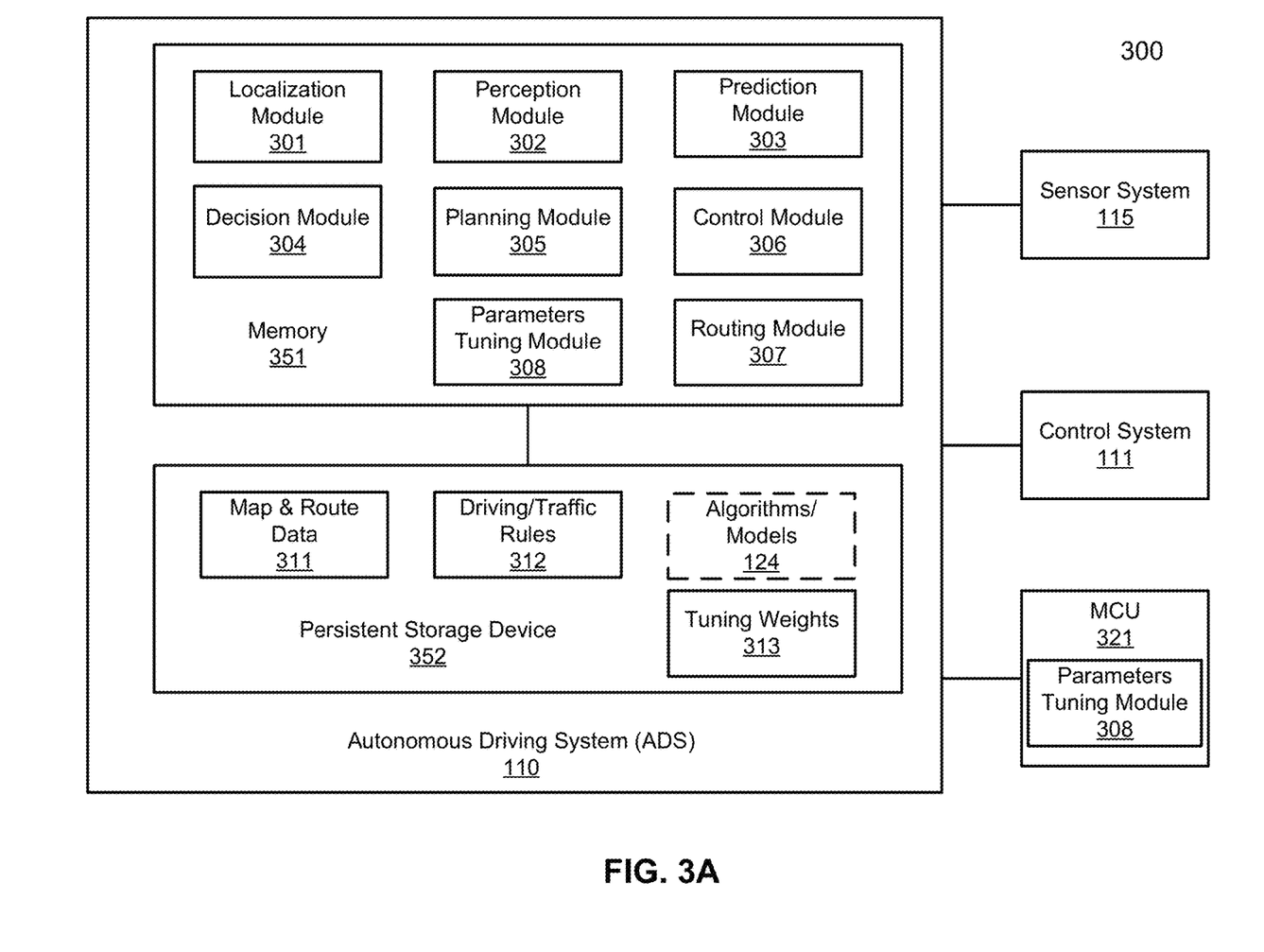
FIGS. 3A-3B are block diagrams illustrating an example of an autonomous driving system used with an autonomous driving vehicle according to one embodiment.
Figure 3B:
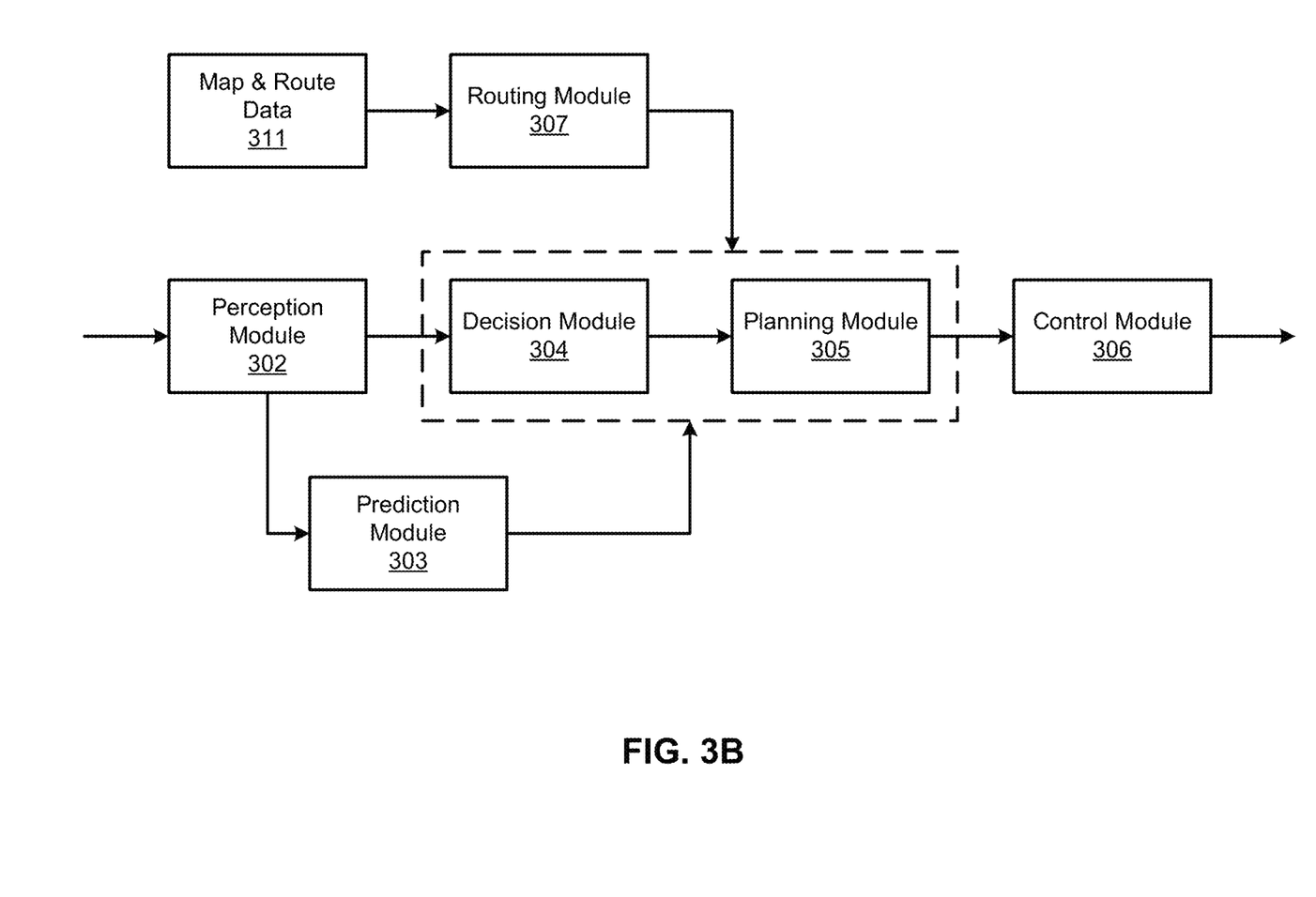

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and control parameters tuning module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
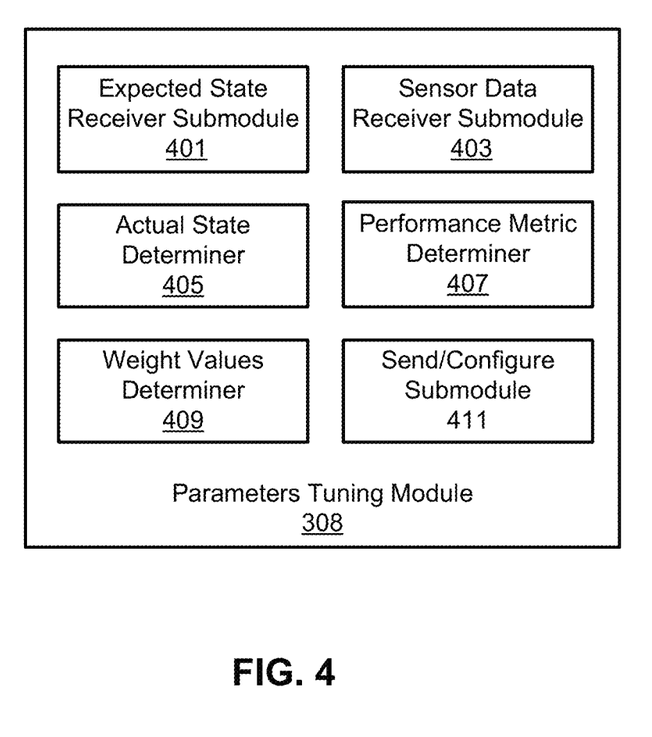
FIG. 4 is a block diagram illustrating a parameters tuning module according to one embodiment.

FIG. 4 is a block diagram illustrating a parameters tuning module 308 according to one embodiment. Parameters tuning module 308 can be part of memory 351 or be part of a microcontroller (MCU) 321 of FIG. 3A. Parameters tuning module 308 can configure a controller to a set of parameters. For example, tuning module 308 can tune (or send instructions to tune) a model predictive controller (MPC) at control module 308 with a set of tuning parameters suitable to a current environment of the ADV. In one embodiment, parameters tuning module 308 includes expected state receiver module 401, sensor data receiver module 403, actual state determiner 405, performance metric determiner 407, weight values determiner 409, and send/configure submodule 411. Expected state receiver module 401 can receive an expected state from a controller. The controller can be a MPC controller and the expected state can include a list of predictive states corresponding to a list of calculated future control inputs for the ADV for a receding time horizon. The list of predictive states and control inputs can be generated by an MPC solver at each planning cycle. Sensor data receiver module 403 can receive sensor data, such as data from a GPS receiver, RTK sensor, and/or IMU sensor. Actual state determiner 405 can determine an actual state of the ADV. The actual state can correspond to an actual velocity, location, and/or steering direction of the ADV. The actual state can be calculated using the sensor data. Performance metric determiner 407 can determine performance metric of the controller. In one embodiment, the performance metric can correspond to the tracking error of the actual state with respect to the expected state. When the performance metric is degrading, weight values determiner 409 can determine a set of weights for the controller. The weight values can be determined by a rule-based algorithm or a machine learning algorithm. The rule-based algorithm can select a set of weight values from tuning weights 313 of FIG. 3A. Send/configure submodule 411 can send the weight values to the controller to update the weights of the controller. For example, MCU 321 can send an instruction to tune the weights of the controller. In another embodiment, send/configure submodule 411 directly configures the weights of the controller. Note that some of submodules 401-411 may be integrated together as an integrated module.

Figure 5:
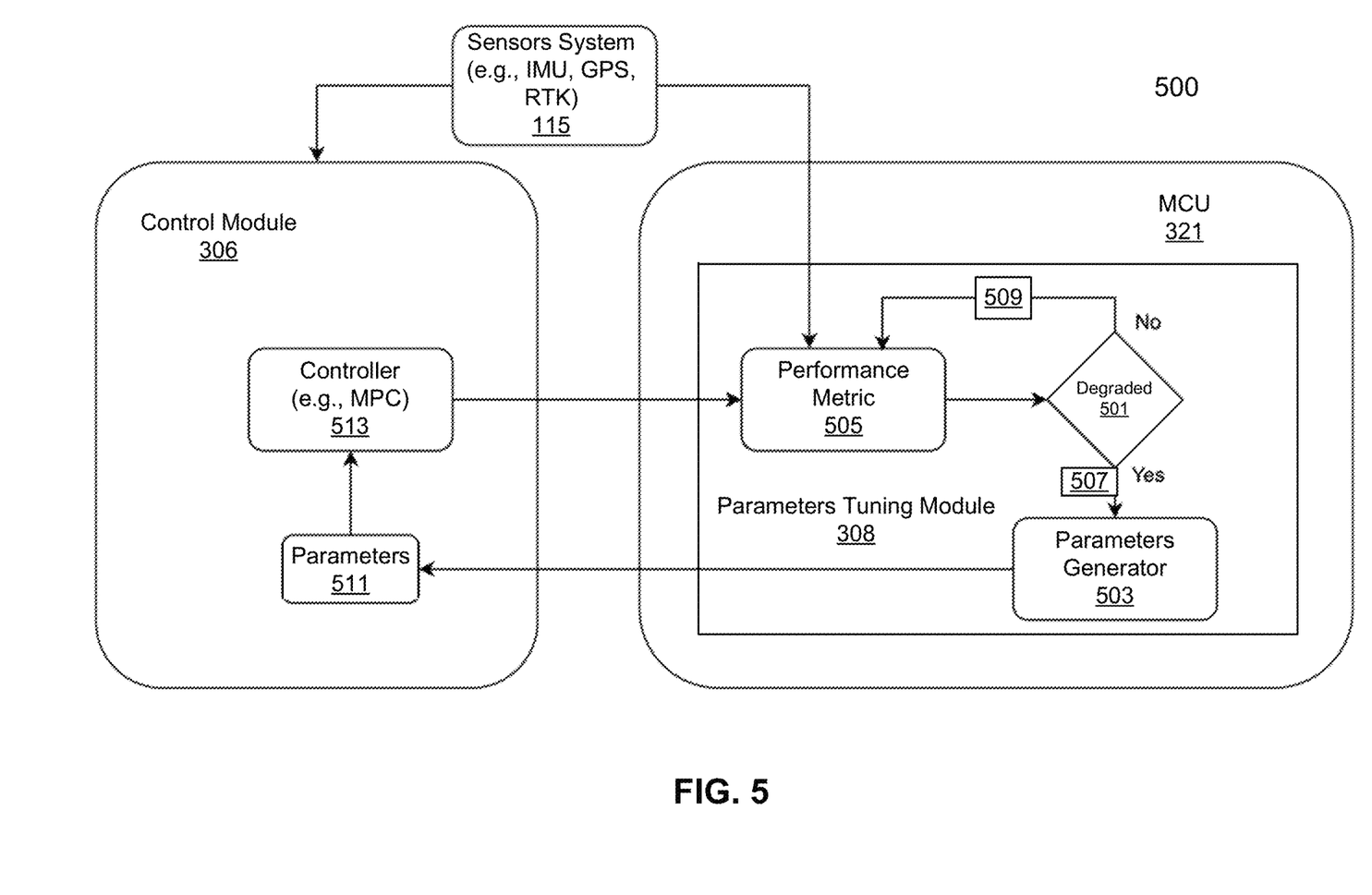
FIG. 5 is a block diagram illustrating a system to tune control parameters according to one embodiment.

FIG. 5 is a block diagram illustrating a system 500 to tune control parameters according to one embodiment. System 500 can tune the parameters of a vehicle motion controller 513 as part of control module 306 of an ADV. Controller 513 can include an MPC model/algorithm. A model predictive controller (MPC) or model predictive control algorithm can be used to control the motion planning of the ADV. MPC refers to a multivariable process control that is used to control a process while satisfying a set of constraints. For example, MPC relies on a dynamic model of the ADV and optimizes a current planning cycle for vehicle controls, while keeping future planning cycles into account. This is achieved by optimizing a finite time-horizon (or receding time horizon), but only executing an action for a current planning cycle and then optimizing again for a next planning cycle, and so forth.

For the dynamic model of the ADV, a state space representation of the ADV can be as follows:

$$x_{t+1} = f(x_t, u_t) = Ax_t + Bu_t,$$

$$y_t = Cx_t$$

where $x_t$ denotes a state vector of the control system representative of the ADV at planning cycle t, $y_t$ denotes the output vector of the control system representative of the ADV, A denotes the state matrix, B denotes the input matrix, $u_t$ denotes the inputs to the control system representative of the ADV, C denotes the output matrix, f denotes the dynamic model of the ADV.

The MPC algorithm used to derive the input controls for the receding time horizon can be as follows:

$$u_{1:T} = MPC_{solver}(J, f(x_t, u_t), T),$$

$$J = \sum_{i=1}^{N} w_{x_i}(r_i - x_i)^2 + \sum_{i=1}^{N} w_{u_i} \Delta u_i^2$$

where $u_{1:T}$ denotes the calculated optimal control inputs over the receding time horizon, J denotes a quadratic cost function for optimization (e.g., minimization) over the receding time horizon, f denotes the dynamic model of the control system, T denotes a time window of the finite receding time horizon, $w_{x_i}$ denotes the weight value for the ith state, $w_{u_i}$ denotes the weight value for the ith input, $r_i$ denotes the ith expected state of total N states, $x_i$ denotes the ith actual state, $\Delta u_i^2$ denotes the squared change in the ith control input, and $MPC_{solver}$ denotes a solver that solves for an optimal control for the MPC. In one embodiment, the MPC solver includes a quadratic programming solver.

$x_t$ and $u_t$ can be further constrained between a minimum and a maximum value to model limitations of the input controls and limitations of the possible vehicle states.

The MPC solver can then minimize the cost function J to generate a predictive state and corresponding control inputs over a receding time horizon. In one embodiment, the $w_{x_i}$ and $w_{u_i}$ weight values can be tuned which adjusts (improve, degrade) the performance of the MPC.

In one embodiment, system 500 can include a microcontroller (MCU) 321. MCU 321 can be an integrated circuit (IC) chip that includes components like memory, input/output peripherals, and one or more hardware processors. MCU 321 can include module 308. In one embodiment, module 308 receives sensor data from sensor system 115. The sensor data can include data from GPS receiver, RTK, and/or IMU sensors. These sensor data can be used to obtain the actual states of the ADV. For example, the RTK sensor can provide information about an orientation of the ADV. The GPS receiver and RTK sensor can provide a geographical location of the ADV. Using the sensor data, an ADV can calculate current vehicle states (e.g., location, velocity, acceleration, orientation/heading direction of the ADV).

In one embodiment, module 308 receives the expected states from controller 513. The expected states can correspond to state 603 of FIGS. 6A-6C. The expected states are calculated states that are predictive or expected of the control system (e.g., ADV). The expected state can differ from the planning state and the actual state as follows.

Figure 6A:
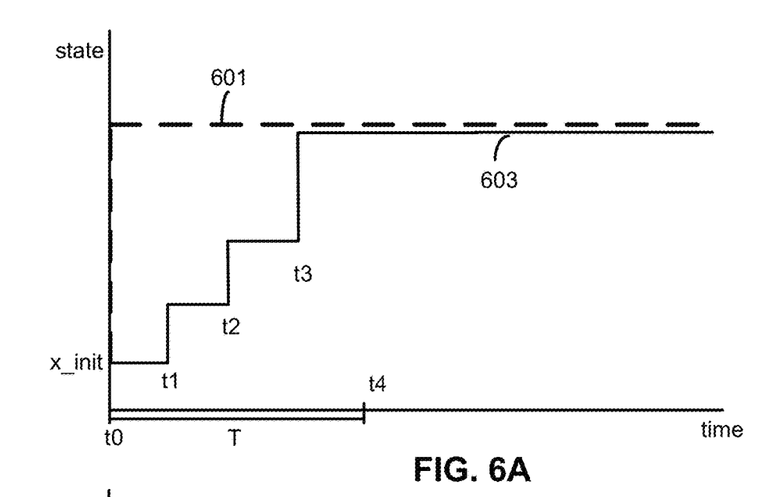
FIGS. 6A-6C illustrate a state of the vehicle at different planning cycles according to one embodiment.
Figure 6B:
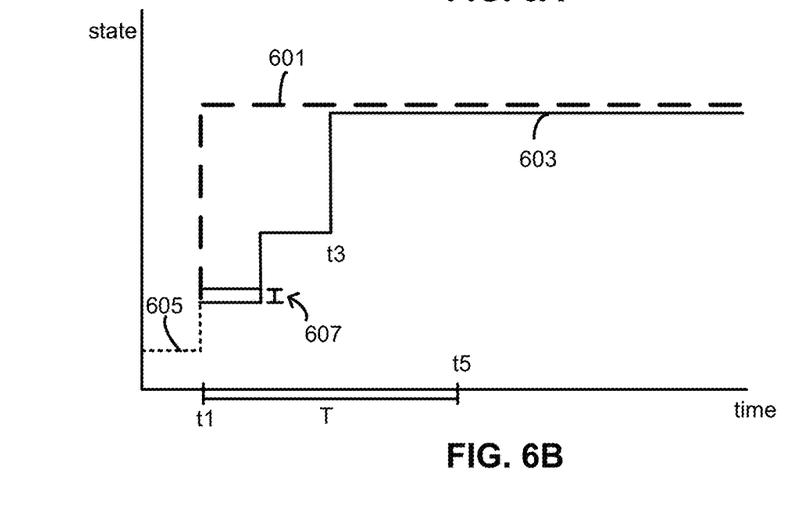
Figure 6C:
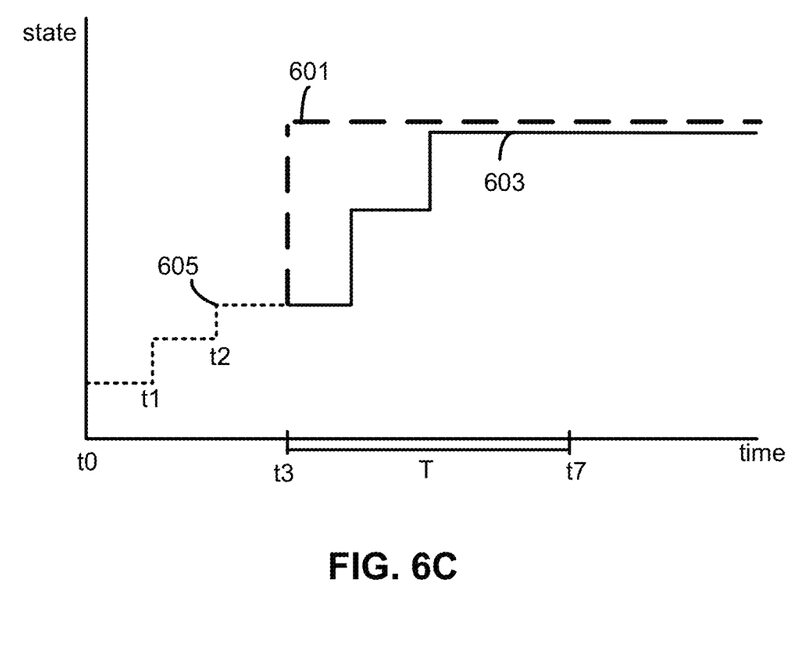

For purposes of illustration, planning state 601, expected state 603, and actual state 603 shown in FIGS. 6A-6C can correspond to the velocity of the ADV. T refers to the windows of receding horizon, and t0 . . . t1 correspond to a planning cycle, and so forth. FIG. 6A can represent the ADV at an initial state at planning cycle t0. FIG. 6B can represent the ADV at planning cycle t1 and when the performance metric is measured. FIG. 6C can represent the ADV at planning cycle t3 and when the performance metric is measured a subsequent time. Although a single state (velocity) is shown in FIGS. 6A-6C, the MPC can calculate expected states for other vehicle states, such as heading direction, position, acceleration etc. Referring to FIGS. 6A-6C, a planning module of the ADV, such as planning module 305 of FIG. 3A, may plan a target state (or planning state) 601 for the ADV. The physical control systems of ADV, however, requires some finite time periods to maneuver the ADV towards target state 601. The predicted state or expected state calculated by controller 513 can be denoted as state 603, which refers to the states controller 513 plans/expects of the ADV to maneuver to get to the target state. The actual state 605 refers to the state that the ADV actually carries out in maneuvering the vehicle by executing a control input by the ADV.

Referring to FIG. 6B, in one embodiment, module 308 can calculate performance metric at a dynamic frequency (e.g., a non-constant time period). For example, at time=t1, module 308 obtains the expected state 603 from controller 513 and derive actual state 605 from sensor data. Module 308 then calculates a tracking error 607 to be a difference between actual state 605 and expected state 603. In one embodiment, the tracking error can be calculated for a predetermined time period (e.g., other time window lengths). In another embodiment, the tracking error can be calculated for the control system of the ADV for a current state, e.g., at time=t1. In one embodiment, the tracking error can be a mean squared error or a difference error.

Once the tracking error is calculated, a performance metric 505 can be calculated to correlate to the tracking error for one or more vehicle states. For example, the performance metric can be the instantaneous tracking error for a particular vehicle state or an average of the tracking errors for two or more vehicle states. In another embodiment, the performance metric can be a sum of the tracking errors of multiple vehicle states.

Referring to FIG. 5, once performance metric 505 is calculated, at block 501, module 308 determines if the performance metric satisfied a predetermined condition, e.g., degraded. In one embodiment, degraded performance metric refers to the performance metric being lower than a previous calculation of the performance metric, e.g., the performance metric decreased. For example, the performance metric decreased (e.g., higher tracking error) compared with a previous planning cycle when the performance metric is calculated. In another embodiment, degraded performance metric refers to the performance metric being less than a predetermined threshold value (e.g., tracking error(s) is higher than a threshold).

At block 503, if the performance metric degrades, parameter generator 503 generates a set of tuning parameters 511 (e.g., weight values for $w_{x_i}$ and/or $w_{u_i}$). Module 308 then sends the set of tuning parameters 511 to controller 513 to tune the weight parameters (e.g., $w_{x_i}$ and/or $w_{u_i}$) of controller 513. In one embodiment, at block 507, module 308 increases the frequency when the performance metric 505 is calculated, such as increasing the frequency by twofold or by some other value, e.g., more frequent.

If the performance metric improved, at block 509, module 308 decreases the frequency when the performance metric 505 is calculated, such as increasing the time period by twofold or by some other value. For example, if the performance metric is initially measured for a planning cycle at time=t1 as shown in FIG. 6B. When the metric improves, performance metric can be measured every two planning cycles, e.g., at planning cycle t3 which is less frequent, as shown in FIG. 6C.

In one embodiment, parameter generator 503 can select a set of tuning parameters from previously derived tuning parameters that are stored in persistent memory (e.g., persistent memory 352 or persistent memory (not shown) of MCU 321 of FIG. 3A) using a rule-based algorithm. For example, the rule-based algorithm can specify different sets of tuning parameters according to current predictive states, control inputs, and/or environment factors. The rule-based algorithm can be an if-else logic. For example, the rule-based algorithm can have a catch all scenario to select a default set of tuning parameters. If certain conditions are met, such as the road slipperiness is greater than a threshold, a set of tuning parameters can be selected to update corresponding weight parameters of controller 513 to account for road slipperiness. Note that tuning parameters, weight parameters, and weight values are used interchangeably throughout this application.

In one embodiment, parameter generator 503 can generate a set of tuning parameters using a machine learning algorithm. For example, the machine learning algorithm can be a supervised or unsupervised algorithm, including linear regression, k-mean clustering algorithm, k nearest neighbor (KNN), support vector machine, and/or a neural network (NN) algorithm, such as a multilayer perceptron (MLP) NN. The machine learning algorithm can be trained using the input/output pairs, such as: (inputs, outputs)=([vehicle states, control inputs, environment factors], [weight parameters of controller]). Once trained, a machine learning algorithm can be used by parameter generator 503 to generate a set of tuning parameters according to the vehicle states, control inputs, and/or environment factors.

Figure 7:
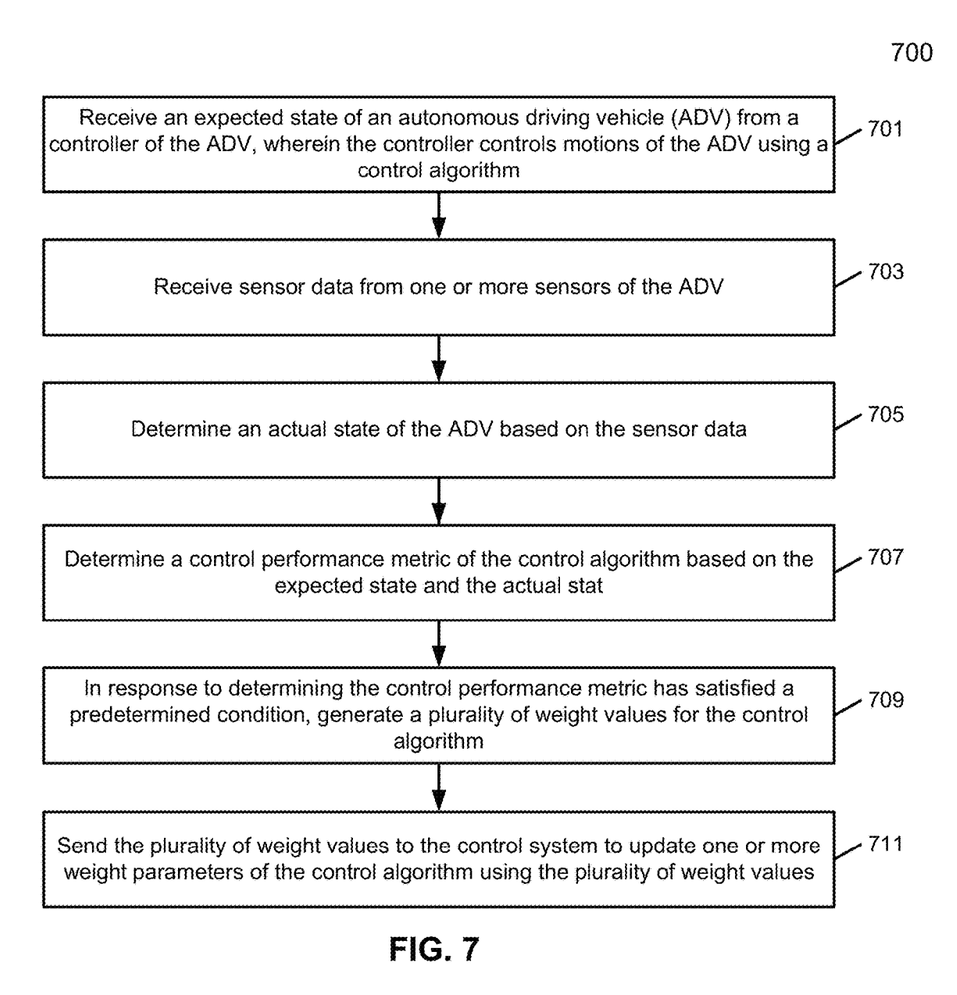
FIG. 7 is a flow diagram illustrating a process to tune control parameters according to one embodiment.

FIG. 7 is a flow diagram illustrating a process to tune control parameters according to one embodiment. Process 700 may be performed by processing logic which may include software, hardware, or a combination thereof. For example, process 700 may be performed by module 308 at MCU 321 or by module 308 at memory 351 of FIG. 3A.

Referring to FIG. 7, at block 701, processing logic receives an expected state of an autonomous driving vehicle (ADV) from a controller of the ADV, where the controller controls motions of the ADV using a control algorithm.

At block 703, processing logic receives sensor data from one or more sensors of the ADV.

At block 705, processing logic determines an actual state (e.g., actual velocity, position, acceleration, orientation/heading direction) of the ADV based on the sensor data.

At block 707, processing logic determines a performance metric of the control algorithm based on the expected state and the actual state.

At block 709, in response to determining the performance metric has satisfied a predetermined condition, processing logic determines a plurality of weight values for the control algorithm.

At block 711, processing logic sends the plurality of weight values to the control system to tune one or more weight parameters of the control algorithm using the plurality of weight values, where the controller controls the ADV using the tuned control algorithm.

In one embodiment, processing logic determines a tracking error based on a difference between the expected state and the actual state and determines the performance metric based on the tracking error.

In one embodiment, determining a plurality of weight values for the control algorithm includes: selecting the plurality of weight values based on a rule-based algorithm, where the rule-based algorithm uses historical states of the ADV, control inputs, and/or one or more environment variables as inputs to select the plurality of weight values.

In one embodiment, determining the plurality of weight values for the control algorithm includes: generating the plurality of weight values based on a machine learning algorithm, wherein the machine learning algorithm is trained using historical data including historical states of the ADV, control inputs, one or more environment variables, and one or more parameters of the control algorithm.

In one embodiment, the performance metric has satisfied a predetermined condition if the performance metric has degraded from a previous iteration, where the performance metric has degraded if a tracking error of the control algorithm has increased.

In one embodiment, the performance metric is measured at a dynamic frequency, where when the control performance degrades, the performance metric is measured at a first frequency and when the control performance improves, the performance metric is measured at a second frequency, where the second frequency is less than the first frequency.

In one embodiment, the expected state or the actual state includes a velocity, an acceleration, or a location of the ADV Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for control parameter tuning, comprising:
   receiving, at a microcontroller unit (MCU), an expected state of an autonomous driving vehicle (ADV) from a controller of the ADV, wherein the controller controls motions of the ADV using a control algorithm;
   receiving, at the MCU, sensor data from one or more sensors of the ADV;
   determining, at the MCU, an actual state of the ADV based on the sensor data;
   determining, at the MCU, a performance metric of the control algorithm based on the expected state and the actual state;
   in response to determining the performance metric has satisfied a predetermined condition, determining a plurality of weight values for the control algorithm; and
   sending the plurality of weight values to the controller to tune one or more weight parameters of the control algorithm using the plurality of weight values, wherein the controller controls the ADV using the tuned control algorithm.

2. The method of claim 1, further comprising:
   determining a tracking error based on a difference between the expected state and the actual state; and
   determining the performance metric based on the tracking error.

3. The method of claim 1, wherein determining a plurality of weight values for the control algorithm comprises: selecting the plurality of weight values based on a rule-based algorithm, wherein the rule-based algorithm uses historical states of the ADV, control inputs, and/or one or more environment variables as inputs to select the plurality of weight values.

4. The method of claim 1, wherein determining the plurality of weight values for the control algorithm comprises: generating the plurality of weight values based on a machine learning algorithm, wherein the machine learning algorithm is trained using historical data including historical states of the ADV, control inputs, one or more environment variables, and one or more parameters of the control algorithm.

5. The method of claim 1, wherein the performance metric has satisfied a predetermined condition if the performance metric has degraded from a previous iteration, wherein the performance metric has degraded if a tracking error of the control algorithm has increased.

6. The method of claim 5, wherein the performance metric is measured at a dynamic frequency, wherein when control performance degrades, the performance metric is measured at a first frequency and when the control performance improves, the performance metric is measured at a second frequency, wherein the second frequency is less than the first frequency.

7. The method of claim 1, wherein the expected state or the actual state includes a velocity, an acceleration, or a location of the ADV.

8. A non-transitory machine-readable medium having instructions stored therein, which when executed by a processor, cause the processor to perform operations, the operations comprising:
   receiving, at a microcontroller unit (MCU), an expected state of an autonomous driving vehicle (ADV) from a controller of the ADV, wherein the controller controls motions of the ADV using a control algorithm;
   receiving, at the MCU, sensor data from one or more sensors of the ADV;
   determining, at the MCU, an actual state of the ADV based on the sensor data;
   determining, at the MCU, a performance metric of the control algorithm based on the expected state and the actual state;
   in response to determining the performance metric has satisfied a predetermined condition, determining a plurality of weight values for the control algorithm; and
   sending the plurality of weight values to the controller to tune one or more weight parameters of the control algorithm using the plurality of weight values, wherein the controller controls the ADV using the tuned control algorithm.

9. The non-transitory machine-readable medium of claim 8, wherein the operations further comprise:
   determining a tracking error based on a difference between the expected state and the actual state; and
   determining the performance metric based on the tracking error.

10. The non-transitory machine-readable medium of claim 8, wherein determining a plurality of weight values for the control algorithm comprises: selecting the plurality of weight values based on a rule-based algorithm, wherein the rule-based algorithm uses historical states of the ADV, control inputs, and/or one or more environment variables as inputs to select the plurality of weight values.

11. The non-transitory machine-readable medium of claim 8, wherein determining the plurality of weight values for the control algorithm comprises: generating the plurality of weight values based on a machine learning algorithm, wherein the machine learning algorithm is trained using historical data including historical states of the ADV, control inputs, one or more environment variables, and one or more parameters of the control algorithm.

12. The non-transitory machine-readable medium of claim 8, wherein the performance metric has satisfied a predetermined condition if the performance metric has degraded from a previous iteration, wherein the performance metric has degraded if a tracking error of the control algorithm has increased.

13. The non-transitory machine-readable medium of claim 12, wherein the performance metric is measured at a dynamic frequency, wherein when control performance degrades, the performance metric is measured at a first frequency and when the control performance improves, the performance metric is measured at a second frequency, wherein the second frequency is less than the first frequency.

14. The non-transitory machine-readable medium of claim 8, wherein the expected state or the actual state includes a velocity, an acceleration, or a location of the ADV.

15. A microcontroller unit, comprising:
a processor; and
a memory coupled to the processor to store instructions, which when executed by the processor, cause the processor to perform operations, the operations including
receiving, an expected state of an autonomous driving vehicle (ADV) from a controller of the ADV, wherein the controller controls motions of the ADV using a control algorithm;
receiving, sensor data from one or more sensors of the ADV;
determining, an actual state of the ADV based on the sensor data;
determining, a performance metric of the control algorithm based on the expected state and the actual state;
in response to determining the performance metric has satisfied a predetermined condition, determining a plurality of weight values for the control algorithm; and
sending the plurality of weight values to the controller to tune one or more weight parameters of the control algorithm using the plurality of weight values, wherein the controller controls the ADV using the tuned control algorithm.

16. The microcontroller unit of claim 15, wherein the operations further comprise:
determining a tracking error based on a difference between the expected state and the actual state; and
determining the performance metric based on the tracking error.

17. The microcontroller unit of claim 15, wherein determining a plurality of weight values for the control algorithm comprises: selecting the plurality of weight values based on a rule-based algorithm, wherein the rule-based algorithm uses historical states of the ADV, control inputs, and/or one or more environment variables as inputs to select the plurality of weight values.

18. The microcontroller unit of claim 15, wherein determining the plurality of weight values for the control algorithm comprises: generating the plurality of weight values based on a machine learning algorithm, wherein the machine learning algorithm is trained using historical data including historical states of the ADV, control inputs, one or more environment variables, and one or more parameters of the control algorithm.

19. The microcontroller unit of claim 15, wherein the performance metric has satisfied a predetermined condition if the performance metric has degraded from a previous iteration, wherein the performance metric has degraded if a tracking error of the control algorithm has increased.

20. The microcontroller unit of claim 15, wherein the performance metric is measured at a dynamic frequency, wherein when control performance degrades, the performance metric is measured at a first frequency and when the control performance improves, the performance metric is measured at a second frequency, wherein the second frequency is less than the first frequency.

* * * * *